United States Patent [19]

Levine

[11] Patent Number: 4,649,543
[45] Date of Patent: Mar. 10, 1987

[54] SYNCHRONIZATION SEQUENCE DECODER FOR A DIGITAL RADIOTELEPHONE SYSTEM

[75] Inventor: Stephen N. Levine, Chicago, Ill.

[73] Assignee: Motorola, Inc., Schaumburg, Ill.

[21] Appl. No.: 771,458

[22] Filed: Aug. 30, 1985

[51] Int. Cl.[4] ............................................. G06F 11/00
[52] U.S. Cl. ............................................ 371/41; 371/5;
455/33; 375/116
[58] Field of Search .................... 371/47, 5, 41, 31;
375/116; 455/33

[56] References Cited

U.S. PATENT DOCUMENTS

| 3,576,947 | 5/1971 | Kruger | 375/116 |
| 4,309,771 | 1/1982 | Wilkens | 371/5 X |
| 4,538,285 | 8/1985 | Gielis | 371/41 X |

*Primary Examiner*—Jerry Smith
*Assistant Examiner*—Robert W. Beausoliel, Jr.
*Attorney, Agent, or Firm*—Raymond A. Jenski; Rolland R. Hackbart

[57] ABSTRACT

A decoding system and method is disclosed for a radiotelephone system carrying digital messages. A set of multibit high auto-correlation, low cross-correlation synchronization words and their ones complement inverses are employed for message synchronization and supervisory functions. System state communication is achieved by utilizing a sequence of normal synchronization words and their ones complement inverses. Reliability of the coding is achieved by detecting normal or inverse words as binary levels when fewer than a predetermined number of bit errors exist in the bit sequence. If the predetermined number of bit errors is exceeded, a selected binary one or zero is substituted. This selected sequence of binary levels is decoded and the Hamming distance between a masked decoded sequence and a masked selected sequence is calculated. If the Hamming distance calculated yields a number less than or equal to a number equal to the synchronization error correction capability of the coding function, the decoded sequence is accepted as correct. If the Hamming distance calculation yields a number greater than the error correction capability value, a new set of substituted binary levels is tried.

34 Claims, 22 Drawing Figures

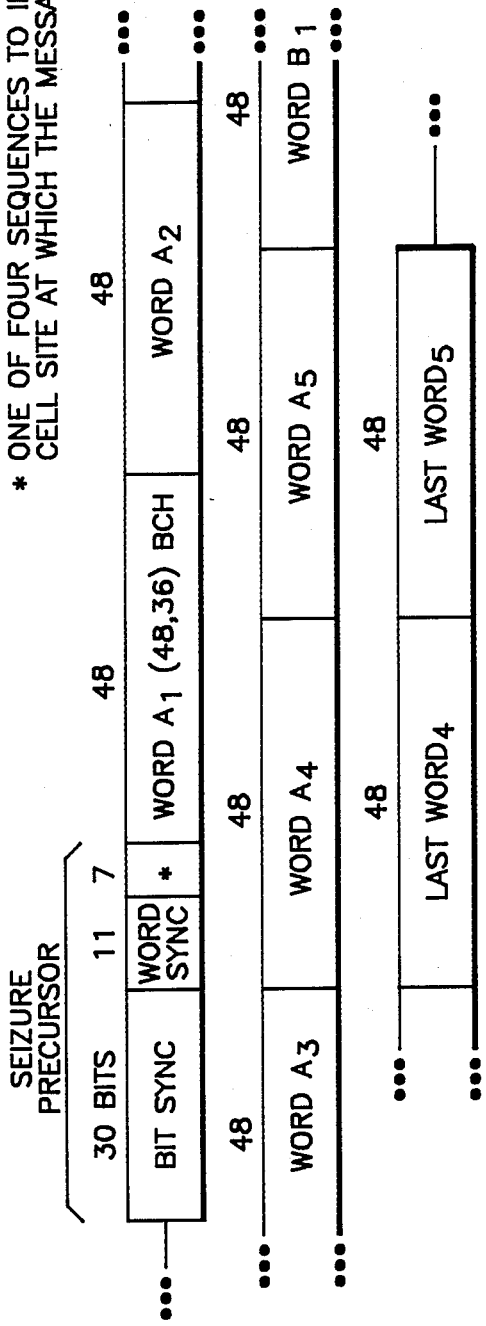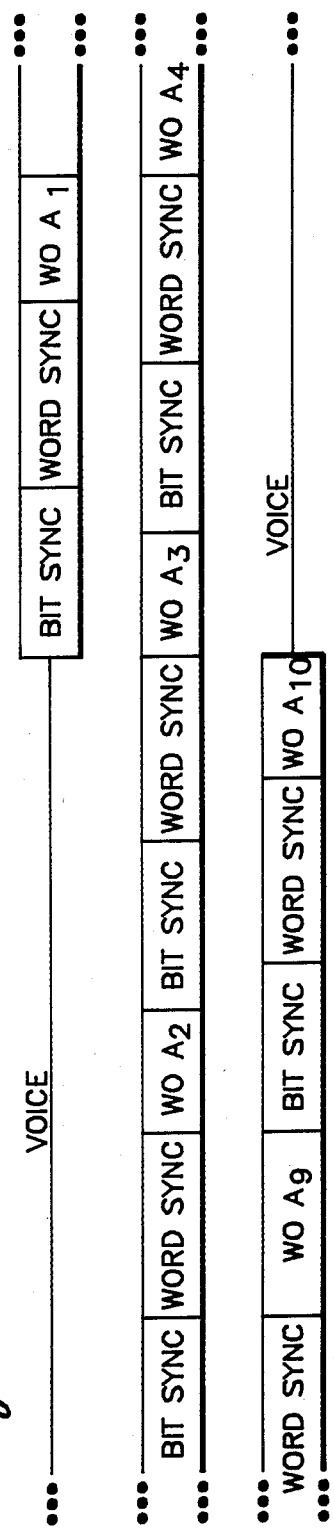
Fig. 3 PRIOR ART
Fig. 4 PRIOR ART

SYNCHRONIZATION SEQUENCE DECODER FOR A DIGITAL RADIOTELEPHONE SYSTEM

BACKGROUND OF THE INVENTION

This invention relates generally to the encoding, transmission, and decoding of digital information in the presence of noise on the transmission channel. More specifically, this invention relates to a unique system and method of decoding digital system information utilizing a sequence of correlation synchronization words. The coding and decoding techniques are based upon a new coding structure developed herein. Reference is made to copending application, Ser. No. 776460, filed on the same date as the present application and containing related subject matter.

Mobile radiotelephone service has been in use for some time and tranditionally has been characterized by a central site transmitting with high power to a limited number of mobile units in a large geographic area. Mobile transmissions, due to their lower power, are received by a network of receivers located remote from the central site and returned to the central site. Due to the limited number of radio channels available, a maximum number of conversations for an entire city would equal the few channels available. Consequently, mobile telephone users discovered that radiotelephone was different than landline telephone due to the often busy conditions of the channels.

To resolve this difficulty, cellular systems were developed to reuse radio channels in a given geographic area. A cellular system characteristically has the coverage area divided into contiguous smaller coverage areas (cells) using low power transmitters and receivers at the central site. One cellular system is further described in U.S. Pat. No. 3,906,166 assigned to the assignee of the present invention. The limited coverage area enables the channel frequencies used in one cell to be reused in another cell geographically separated according to a predetermined plan. One such plan is disclosed in U.S. Pat. No. 4,128,740, assigned to the assignee of the present invention. Thus, a large number of channels can be made available in a metropolitan area and the service can appear to be identical to a standard telephone.

The cell system typically utilizes one channel in each cell to receive requests for service (on a "reverse set-up" frequency) from mobile subscriber units, to call mobile subscriber units (on a "forward set-up frequency") and to instruct mobile subscriber units to tune to a frequency pair where a conversation may take place (a "voice" channel). The one "set-up" channel in each cell is continuously assigned the task of receiving and transmitting data and is the channel to which the subscriber unit tunes when not in a conversational state.

Since the cells may be of relatively small size, the likelihood of a mobile or portable subscriber unit traveling out of one cell and into another is high. To maintain communications, the subscriber unit is "handed-off" between one cell and another. The cellular systems in use track the unit and decide when a handoff is necessary to maintain quality communications. The subscriber unit is commanded, via a high speed data message interrupting the audio communications on the voice channel, to retune the transceiver to another frequency which is available in a new cell. This handoff requires a relatively short period of time and the user is generally unaware of the occurrence.

Since cellular telephone systems provide performance characteristic of the land line telephone system and interconnect with it, subscribers expect land telephone system features from the cellular telephone system. One such feature is the transmission of data from one location to another. Many telephone subscribers connect data communications devices, such as a personal computer, to the telephone system via a modem. Modems are familiar to those skilled in the art and fundamentally operate by converting data "1" and "∅" levels to distinct tones or to particular tone waveform phase relationships which can be transmitted by the land telephone network.

It would be natural to connect a computing device via a modem to a radiotelephone subscriber unit for communication with another data generating device via the land telephone network. In fact, this has been done and produced unsatisfactory results. Rapid multipath fading, commonly experienced in high frequency cellular radiotelephone communications, causes gaps and significant phase changes in modem-generated tones such that data carried by the radio channel becomes garbled or missing. Furthermore, a handoff between cells, which to a human engaged in conversation is virtually unnoticeable, becomes a formidable obstacle for the communication of data generated by a data generating device.

This limitation has been resolved by converting the input data to a data format compatible with radio channel transmission and reconverting the radio channel data format back to the original format upon reception. The data transmission is halted prior to a handoff and is resumed after the handoff is completed. A detailed description of the above process may be found in U.S. patent application No. 630,481 filed on July 13, 1984 in behalf of Labedz, et al. and assigned to the assignee of the present invention.

A second feature of the landline telephone system which subscribers to a cellular radiotelephone system wish to have is that of relative security of their conversations. Digital scrambling techniques for secure radio communication channels has been disclosed in U.S. Pat. Nos. 4,167,700; 4,434,323; and 4,440,976 each assigned to the assignee of the present invention. These inventions, however, do not address the aforementioned handoff requirement of cellular systems and do not provide the necessary transponding of a supervisory signal to maintain communications on an assigned channel.

Cellular systems, to reduce interference between cochannel users, employs several distinguishable signals (SAT signals) to identify cellular fixed sites. Each site is assigned one signal which is transmitted with each transmission from fixed site to subscriber unit. The subscriber unit, in turn, transponds the same signal to the fixed site and the radio channel connection is maintained. If anomalous propagation enables cochannel transmission to or from one cell to be received in another cell, the lack of a properly transponded signal will cause the radio channel to be deallocated from the interfering subscriber unit. These distinguishable SAT signals typically are unique tone frequencies for analog transmissions and unique bit sequences for digital transmissions.

The use of a digital frame synchronizing bit sequence for the system tasks of synchronizing, supervisory signal (SAT), and system control message transmission has been disclosed in the previously mentioned copending U.S. patent application Ser. No. 771,460. Conventional coding and decoding methods do not take full advantage of the latent error detection and correction power of a coding technique employing a sequence of multiple bit synchronization words to carry information. Error detection and correction, as previously practiced, relies upon redundancy of information, correlation techniques, or parity to correct one or more bits in an information bit string. Each bit in the information string is either correct or in error. The present invention utilizes a third possible state in the information bit string - a "missed" bit. Each "bit" in the system control message of the present invention is derived from a synchronization bit sequence word, itself consisting of a plurality of bits.

SUMMARY OF THE INVENTION

Accordingly, it is an object of the present invention to include synchronization, supervisory (SAT) information, and system state in a fixed bit length synchronization word.

It is a further object of the present invention to employ high autocorrelation, low cross correlation multiple bit words and their ones complement inverses as a set of synchronization words.

It is a further object of the present invention to code system state messages into predetermined sequences of synchronization words.

It is a further object of the present invention to receive and decode the system state messages from a noisy channel with error detection and correction enhanced by the capability of detecting a missed synchronization word and substituting a correct synchronization word in place of the missed word.

These and other objects are achieved in the present invention which, stated briefly, is a decoder for decoding system states in a radiotelephone system carrying digital messages. The states of the system are conveyed in sequences of normal and ones complement inverse synchronization words. The synchronization words are detected as one binary level for a normal word and the other binary level for an inverse word. If a predetermined number of bit errors are exceeded in the synchronization word, either bit state may be selected so that a decoded sequence of binary levels is created. A decoded sequence of binary levels, corresponding to one of the system states, is generated and compared to the selected sequence. A correct sequence decode is indicated when the comparison indicates a predetermined correlation between the decoded sequence and the selected sequence.

BRIEF DESCRIPTION OF THE DRAWINGS

FIG. 3 is a timing diagram of the signalling format used on the reverse set-up channel of a conventional cellular system.

FIG. 4 is a timing diagram of the signalling format used on the forward voice channel of a conventional cellular system.

DETAILED DESCRIPTION OF THE PREFERRED EMBODIMENT

Figure 1:
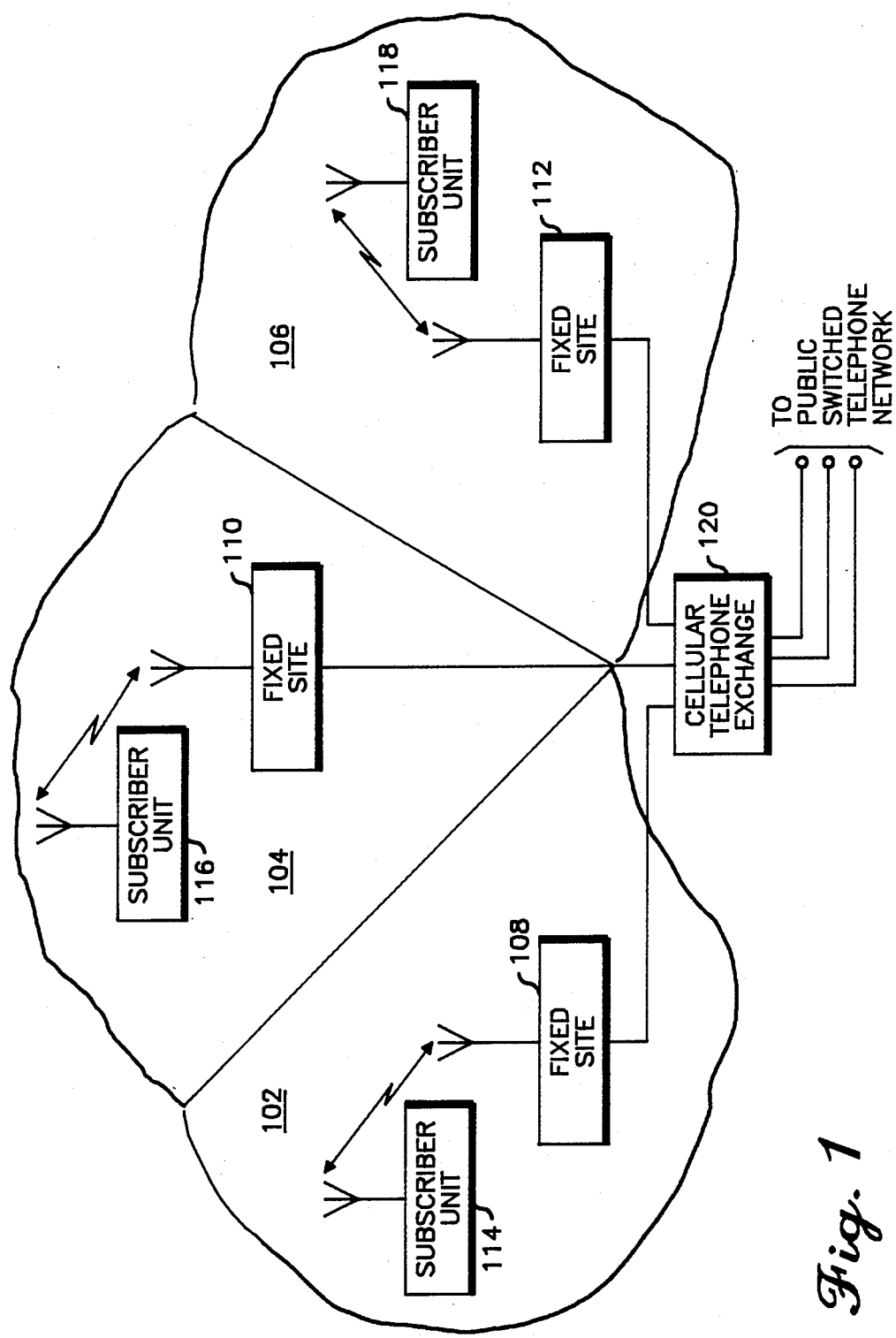
FIG. 1 shows a block representation of a conventional three cell cellular system.

A representation of a multisite radio system such as that which may be employed by a cellular radiotelephone system is shown in FIG. 1. In this representation, a geographic area is shown divided into three of a possible many radio coverage areas (102, 104, and 106) which are commonly called cells. Generally located within each cell is a configuration of fixed site equipment shown as fixed site equipment 108, 110, and 112. The fixed site equipment typically consists of receivers, transmitters, and a site controller. In one implementation of a cellular system, the fixed transmitters and receivers are located at the center of each cell and illuminate this cell with radio signals omni-directionally or directionally. Other cellular implementations place the fixed site at the periphery or elsewhere within the cell. Further discussion of a center illuminated sectorized cellular system may be found in U.S. Pat. No. 4,128,740 assigned to the assignee of the present invention.

A plurality of subscriber units are typically present in each cell and are represented in FIG. 1 by subscriber units 114, 116 and 118. Any particular subscriber unit may be vehicle mounted or may be hand carried. Each subscriber unit in a cellular radiotelephone system has the capability of initiating and maintaining a telephone call via one of the transmitters and one of the receivers of the fixed site equipment and a cellular telephone exchange 120. The cellular telephone exchange 120 performs call routing and public switch telephone network interface and may be a device such as an EMX 500 marketed by Motorola, Inc. The cellular telephone exchange 120 may accept a call from either the public switch telephone network or a subscriber unit and route that call to its proper destination.

In a conventional cellular system, one duplex radio channel is assigned the task of transmitting information such as call requests, voice channel assignments, handoff instructions as a served subscriber unit travels out of the radio coverage area of one cell and into the radio coverage area of another cell, and system maintenance instructions. On the inward or reverse set up channel half of the duplex channel, the fixed site controller receives requests for service and other functions from the subscriber unit. Actual message transmission occurs on another duplex channel, commonly known as a voice channel, available within a radio coverage cell.

Thus, a telephone call may come in from the switched telephone network to the cellular telephone exchange 120, be routed through fixed site equipment 110 which determines if a voice channel is available in cell 104 and instructs subscriber unit 116 to tune to the unoccupied voice channel via the forward set up channel. The subscriber unit 116 tunes to the designated voice channel and message conversation may begin.

To provide a check of the continuing operation of the subscriber unit during a conventional cellular radiotelephone call, a tone, equivalent to the DC supervision in normal telephone operation, is transmitted continuously from the fixed site controller via the fixed transmitter, received by the subscriber unit and retransmitted by the subscriber to the fixed site receiver. This tone is known as supervisory audio tone (SAT), and is used inter alia, to control cochannel interference. In conventional cellular systems, small offsets in the frequency of the SAT are used to identify each cell and if the subscriber unit having service does not transpond the proper SAT, the call will be terminated.

Figure 2:
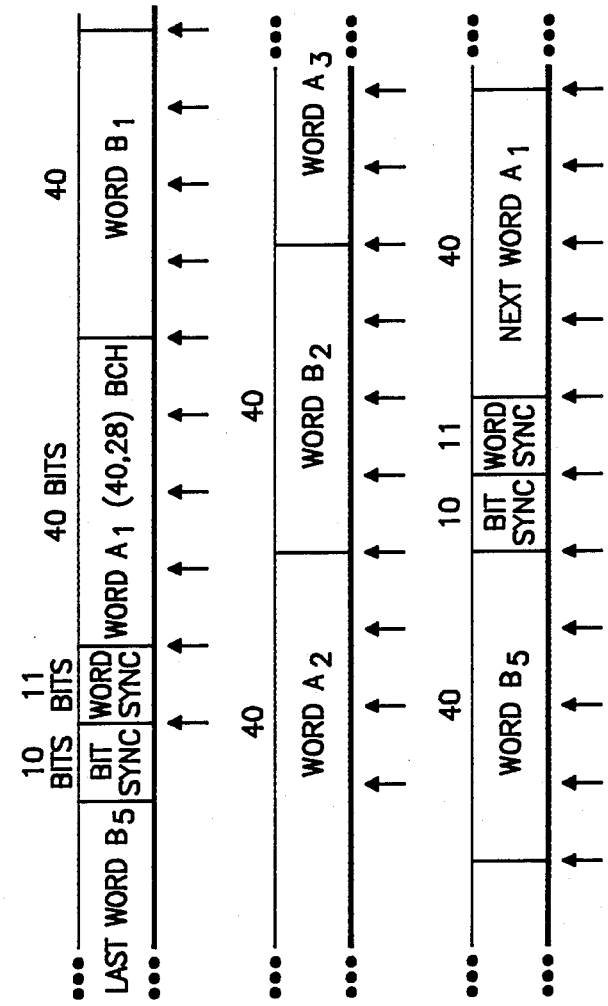
FIG. 2 is a timing diagram of the signalling format used in the forward set-up channel of a conventional cellular system.

In a cellular system having relatively large numbers of subscriber units, a large amount of information must be transmitted and received on the set-up channel. Efficient design suggests that the data be organized into a synchronous format of fixed length words and synchronizing pulses. The conventional format for signalling on a cellular system forword set-up channel is shown in FIG. 2 and the format for the cellular system reverse set-up channel is shown in FIG. 3. One source of poor reliability is error introduced in the radio channel by Rayleigh fades caused by subscriber unit motion through the multi-path interference patterns generated by reflection from obstacles near the receiving equipment. These errors generally occur in dense bursts with the average burst duration related to the average fade length. Additionally, the bit error probability is substantially independent of data rate until bit lengths approach the average fade duration. This characteristic indicates that to minimize errors, data rates should either be very low or as high as channel bandwidth allows. Due to the amount of information to be transmitted and the availability of conventional error correction techniques, a 10 KBS data rate was chosen for the standard data rate of the cellular system in the United States.

System control data messages may also be sent on the voice channels. These messages are primarily handoff messages directing a subscriber unit to tune to another channel but may also include other control functions such as subscriber unit transmitted power control. In a conventional cellular system the technique used is "blank and burst" in which the voice signal is muted and a data signal, shown in FIG. 4, is sent at a 10 kilobit rate.

The standard landline telephone employs a DC current to indicate whether the telephone user is on hook or off hook. Most cellular radio telephone systems employ a tone analogous to the DC current for call supervision. By employing slightly different frequencies of analog tones, co-channel interference between neighboring cell radio coverage areas may be reduced. The tone is transmitted from the fixed site equipment on an active voice channel and is received and retransmitted by the subscriber unit using the channel. If another tone frequency is returned, the fixed site controller interprets the incoming signal as being corrupted by interference and the audio path is muted.

As users travel through the cellular system they may reach the coverage limit of one cell and therefore be better served by another cell. The process of switching the call from one cell to the other is known as handoff. When a need to handoff a subscriber unit from one cell to another occurs, a message is sent to the subscriber unit in the blank and burst format on the voice channel. The subscriber unit mutes the audio and tunes to a radio channel which was indicated in the blank and burst data message. The audio is unmuted when the subscriber unit has tuned to the new channel.

It has become increasingly desirable to provide cellular radio telephone systems with the capacity to carry more than analog voice messages. Purely data messages, such as those generated by data terminals or by digitized voice devices, has become increasingly common. One method of conveying purely data messages via a cellular radio telephone system was shown and described in U.S. patent application Ser. No. 630,481 filed in behalf of Labedz et al. on July 13, 1984 and assigned to the assignee of the present invention. There, data messages were encoded into a format compatible with the prior art data formats previously described. Additionally, methods for preventing data loss during handoff and for providing data signals equivalent to the supervisory tone were shown and described. The invention of the present application provides a means for encoding system control information for high speed data or digitized voice, transmitting the same over a cellular radiotelephone system, and decoding the system control information with minimized errors.

Figure 5:
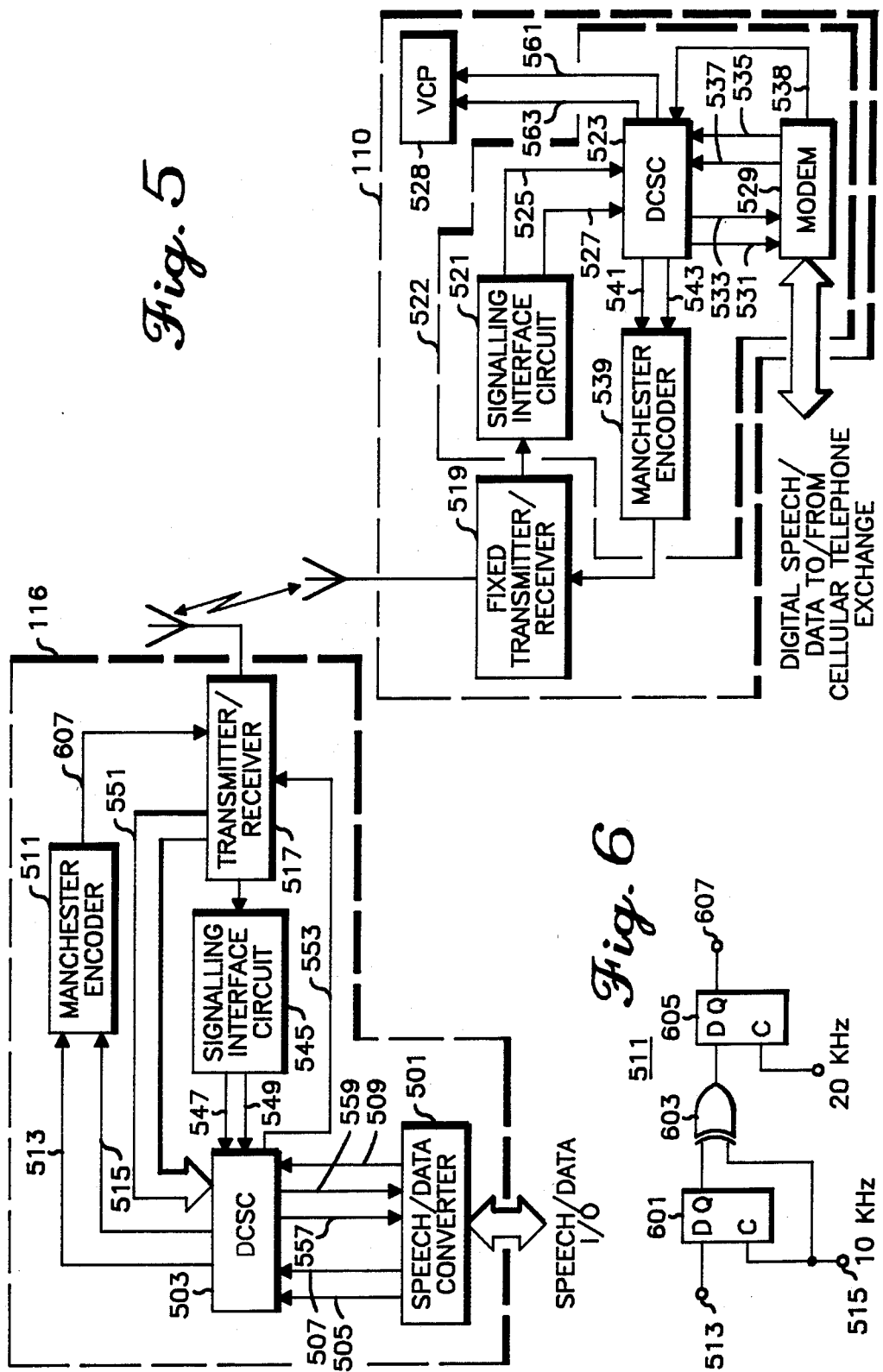
FIG. 5 is a block diagram of the subscriber unit and the fixed site equipment which may be used to realize the present invention.
Figure 6:
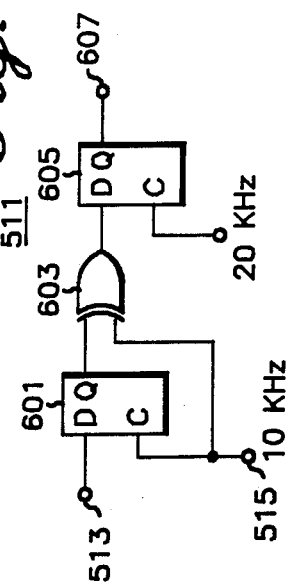
FIG. 6 is a schmatic diagram of a Manchester data encoder which may be utilized in the present invention.

The two basic components of the system of the present invention are shown in FIG. 5. A block diagram of a subscriber unit 116 is shown communicating with a fixed site 110. A signal to be transmitted by the subscriber unit 116 is input to speech/data converter 501 which performs an analog to digital conversion and may be implemented with an MC14402 Codec available from Motorola, Inc. A digital signal, representative of the input speech or data, is coupled to a digital cellular signalling control (DCSC) function 503 via a 9.6 KBS transmit data line 505 and a 9.6 KBS transmit clock line 507. Additionally, a 10 KBS clock line is coupled between the speech/data converter 501 and the DCSC 503 on line 509. The unique functions performed by the DCSC 503 will be described later. Binary data at a rate of 10 KBS is output from DCSC 503 to conventional Manchester encoder 511 via 10 KBS transmit data line 513 and 10 KHz clock line 515. A Manchester encoder 511 may be implemented with discrete logic functions as shown in FIG. 6. Ten KBS transmit data may be input on line 513 to a conventional DQ flip-flop 601 which is clocked by the 10 KHz clock input on line 515. The Q output of flip-flop 601 represents a clocked delay of the input and exclusive OR-ed is input to exclusive OR 603 where it is against the 10 KHz clock to produce an output which is a Manchester encoded data corrupted by transients. This output is coupled to DQ flip-flop 605 which is clocked by a 20 KHz clock signal conventionally derived and having edges coincident with the 10 KHz input signal to remove the undesirable transients. The Q output of flip-flop 605, on line 607, is a conventional Manchester encoded version of the input data.

Returning to FIG. 5, the output of Manchester encoder 511 is input to the transmitter of transmitter/receiver 517 which transmits the signal on a channel assigned by the cellular system. The transmitter/receiver 517 may be any mobile or portable transceiver compatible with a cellular system and is generally described in service manual 68P81066E40-0 available from Motorola, Inc.

The transmitted signal is received by a fixed site receiver of fixed transmitter/receiver 519 which is part of the fixed site equipment 110. The fixed transmitter/receiver 519 may be any fixed radio equipment suitable for use with cellular telephone systems and is further described in service manual 68P81060E30-0 available from Motorola, Inc. The data signal is demodulated from the radio carrier by the receiver and coupled to a signalling interface circuit 521 which is part of the site controller 522 and which recovers 10 KBS binary data and a 10 KHz clock for presentation to the fixed site DCSC 523 via lines 525 and 527 respectively A VCP 528 (Voice Control Processor such as that described in the Fixed Network Equipment service manual no. 68P81052E50 and available from Motorola, Inc.) performs the functions of controlling the receive and transmit baseband audio, receiving SAT, and relaying SAT and other system control messages to higher level system processors (not shown). The DCSC 523 is similar to DCSC 503 and will be described later. The 9.6 KBS recovered data and its clock is presented to a conventional modem 529 via lines 531 and 533, respectively, for transmission down conventional wire line facilities to the cellular telephone exchange. Digital speech/data from the cellular telephone exchange is input to modem 529 for conversion to 9.6 KBS data and clock and coupled to DCSC 523 via lines 535 and 537 respectively. The modem 529 also produces a 10 KBS clock synchronous with the 9.6 KBS clock for presentation to DCSC 523 via line 538 and subsequent coupling to Manchester encoder 539 (which may be an implementation identical to Manchester encoder 511) via lines 541 and 543 respectively. The Manchester encoded signal is coupled to the fixed transmitter/receiver 519 for transmission to the subscriber unit 116.

The subscriber unit 116 receives the transmitted signal and demodulates it in the receiver of transmitter/receiver 517 and couples the demodulated Manchester encoded 10 KBS signal to signalling interface circuit 545. The signalling interface circuit 545 recovers the 10 KBS binary data and clock and presents them to DCSC 503 via lines 547 and 549. The transmitter receiver 517 also provides a two bit digital representation of the digital message equivalent to the supervisory tone employed in conventional cellular telephone systems on line 551. The DCSC 503 provides a detect logic level to transmitter/receiver 517 on line 553 to indicate presence of the proper digital SAT signal. The DCSC 503 couples 9.6 KBS data and clock to the speech/data converter 501 on lines 557 and 559 respectively. Speech/data converter 501 regenerates the original analog or data signal input from the cellular telephone exchange.

Figure 7:
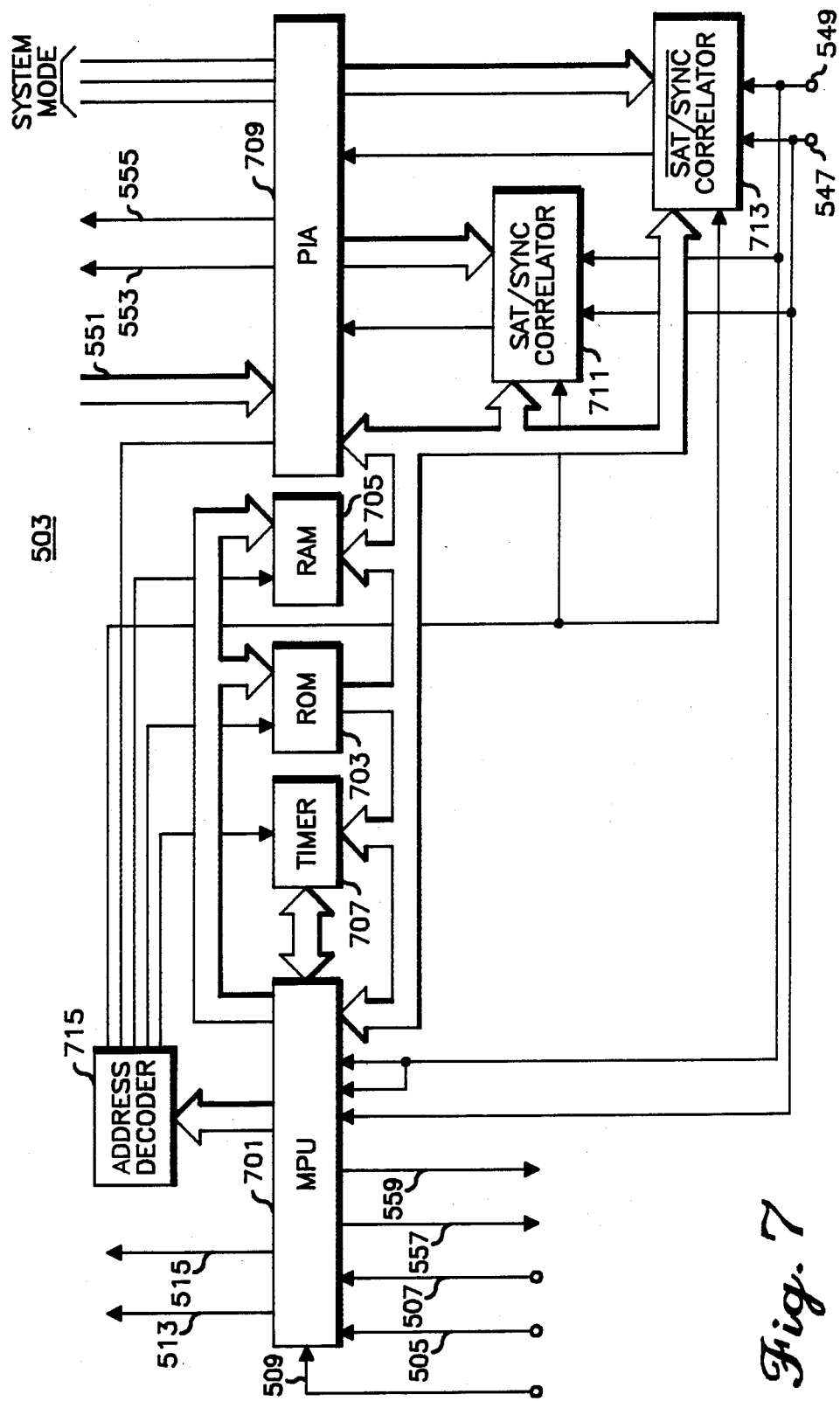
FIG. 7 is a block diagram of a digital cellular signalling control (DCSC) circuit which may be employed in the present invention.

The digital cellular signalling control (DCSC) function 503 is shown in detail in FIG. 7. The block diagram for DCSC 523 is similar except that an additional output of digital signalling tone detect is output to the VCP 528 on line 561. SAT detect is coupled to VCP 528 via line 563. The digital cellular signalling control (DCSC) is a microprocessor based data conversion and interpretation unit which employs a microprocessor 701 (which in an preferred embodiment may be an MC 6809 marketed by Motorola, Inc.) and associated memory. The memory is realized by conventional read-only memory (ROM) 703 and random access memory (RAM) 705. A timer 707 times the position and duration of SAT/SYNC words. A peripheral interface adapter (PIA) 709 provides an interface function between the microprocessor 701 and the other devices on the bus and performs the functions of bus buffer and latch. SAT/SYNC correlator 711 and $\overline{SAT/SYNC}$ correlator 713 are conventional bit correlators and are described in conjunction with FIG. 25. Address lines A-13 through A-15 are coupled from microprocessor 701 to address decoder 715 and are used as chip select lines for $\overline{SAT/SYNC}$ correlators 711 and 713, timer 707, ROM 703, RAM 705, and PIA 709.

Figure 8:
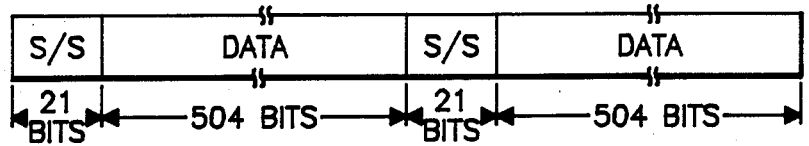
FIG. 8 is a timing diagram of the generalized synchronization format employed in the present invention.

The unique format for transmitting digitized speech, terminal data, and special control messages over a cellular voice channel employed by the present invention is shown in FIG. 8. With a 10 KBS channel bit rate, this format effectively provides a high speed 9.6 KBS data rate over a conventional cellular radio telephone system channel bandwidth.

The SAT/SYNC (S/S) word is a 21 bit correlator word which uniquely provides combined radio frequency (RF) frame synchronization, digital SAT (supervisory tone) information, and system state information. A set of six 21 bit correlator words have been developed for the SAT/SYNC function in the preferred embodiment. This set consists of three normal correlator words $(S/S)_1$, $(S/S)_2$ and $(S/S)_3$ plus their ones complement inverses $\overline{(S/S)}_1$, $\overline{(S/S)}_2$, and $\overline{(S/S)}_3$. This set may be designed to provide high auto/correlation properties (i.e. a 21 bit match when the word is aligned in the correlator and less than or equal to 2 bit match when the word is not aligned) and low cross correlation properties (a 21 bit match when aligned and a less than or equal to 6 bit match when not aligned) within the set by those skilled in the art. The method by which these auto correlator words are used to provide SAT information, speech and data RF frame synchronization, and system information is as follows:

Each of the three S/S correlator words and its inverse corresponds to one of the three SAT frequencies in general use by cellular radiotelephone systems (5970, 6000, and 6030 Hz). During a cellular call, one normal S/S and/or its inverse is used to convey supervisory information from the fixed site to the subscriber unit. The subscriber unit must then detect the S/S or its inverse and transpond it to the fixed site. The 21 bit correlators (711 and 713 of FIG. 7) at the subscriber unit and at the fixed site controller are programmed to detect one of three SAT words and its inverse. Due to the low cross correlation between words, the probability of one SAT falsing another is very small.

The low noise and cross SAT falsing probabilities are made possible by using all 21 bits for both correlation and for synchronization, rather than splitting the overhead bits for separate signalling tasks.

SAT information is conveyed between the fixed site and the subscriber unit by transmitting either S/S or its inverse $\overline{S/S}$. This allows system mode information to be continuously transmitted between the subscriber unit and the fixed site by encoding the sequence of transmitted S/S and its inverted words. System mode changes are communicated between the subscriber unit and the fixed site with automatic confirmation of the mode made via the transponded SAT signalling. SAT signalling is never interrupted during mode changes by utilizing the full 21 bit S/S correlator word for system mode definition. Since 21 bits are used in each S/S word detection, a high degree of protection is provided against incorrect mode changes. Additionally, this method also allows a double frame format for transmitting data terminal messages which will be described later.

Figure 9:
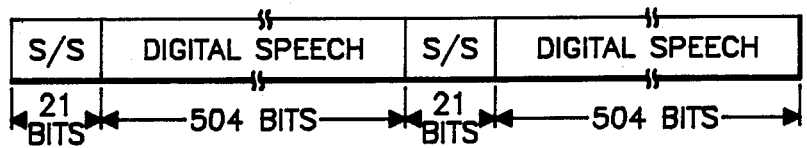
FIG. 9 is a timing diagram of the synchronization and digitized speech mode format employed in the present invention.

The format for transmitting digitized speech at 9.6 KBS is shown in FIG. 9. This is a more specific format than that shown in FIG. 8 in that the 504 bits of data comprise digitized speech. The ratio of 504 bits of digitized speech to 21 bits of overhead (SAT/SYNC) information provides an effective speech throughput of 9.6 KBS. SAT is continuously sent by transmitting the proper correlator word, S/S, which corresponds to the correct SAT frequency.

Figure 10:
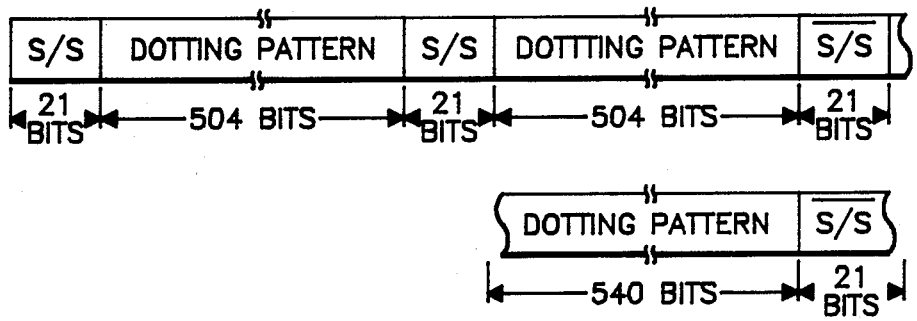
FIG. 10 is a timing diagram of the data halt transmission beginning the digitized speech mode employed in the present invention.

In the preferred embodiment, digitized speech mode is defined by transmitting only inverse S/S words for RF frame sync and SAT information. Four S/S words and their cyclic permutations define the system mode, (digital speech=0000; digital speech (RF only)=1111; digital data=1010 or 0101; and digital halt=1100, 0110, 0011, or 1001). In operation, a cellular radiotelephone call may be originated in the clear (non-digital) mode where the conventional analog SAT is sent and transponded When the radiotelephone user wishes to switch to the digital speech mode, as he might if he were using a digital voice privacy device sometimes colloquially known as a scrambler, a reverse voice channel message is sent to the fixed site requesting a digital channel for private speech mode. After the fixed site receives the digital request message, it engages the digital site controller 522 of FIG. 5 and transmits the digital SAT format shown in FIG. 10 on the assigned radio channel. The 504 bits of "dotting" information (which may be the bit pattern 001100110011 . . . ) is used for bit synchronization. This subscriber unit then transponds the digital SAT signalling format to the fixed site, confirming that the subscriber unit is in the correct mode and is on the correct digital channel. Once in the digital mode, all further mode changes and confirmations are made by changing the S/S and the $\overline{S/S}$ sequences.

If a digital channel to be assigned to this subscriber unit is not the same as the channel currently used by this subscriber unit, a handoff command is transmitted from the fixed site to the subscriber unit to switch to a channel capable of digital service. The subscriber unit repeats the digital service request message until it receives the correct digital SAT and speech mode format.

To set up a digital privacy call (for example to transport public key information), the 504 bit dotting pattern may be replaced with encryption set-up data. After the digital privacy call is set-up, the 504 bit frame is used to transmit the digitally encoded speech at an effective rate of 9.6 KBS. The digitized speech data is subsequently used to derive bit synchronization between the S/S correlator words. If a predetermined number of consecutive S/S sequences are lost, speech is muted. When digital voice privacy is employed, continuous bit synchronization from the subscriber unit through the fixed site to a landline encryption device allows proper operation of the encryption key generator without requiring periodic key generator data transfer. In the preferred embodiment, the bit synchronization withstands RF phase jumps, channel fading, drift between RF and landline modem clocks, and bit slippage due to an out-of-lock phase locked loop at the subscriber unit or the fixed site.

Figure 11:
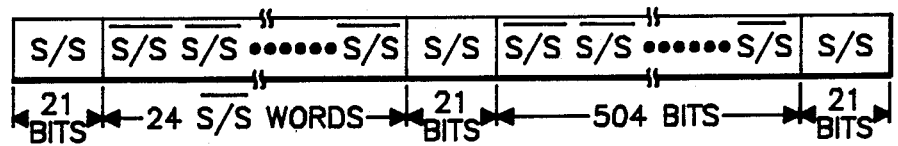
FIG. 11 is a timing diagram of the data format for digital signalling tone (DST) employed in the present invention.

Digital signalling tone information can be transmitted coherently with SAT, using the format shown in FIG. 11. Twenty-four inverted ($\overline{S/S}$) words of the same "SAT frequency" are inserted in the 504 bit frames. The 21 bit S/S words continue to be used to define SAT information, system mode, and frame timing. In the preferred embodiment, the fixed site may have a flexible algorithm to detect a majority number of the 24 inverted ($\overline{S/S}$) words transmitted every frame of 525 bits. This method provides a very high signalling tone detect probability, while keeping the falsing probability low.

Figure 12:
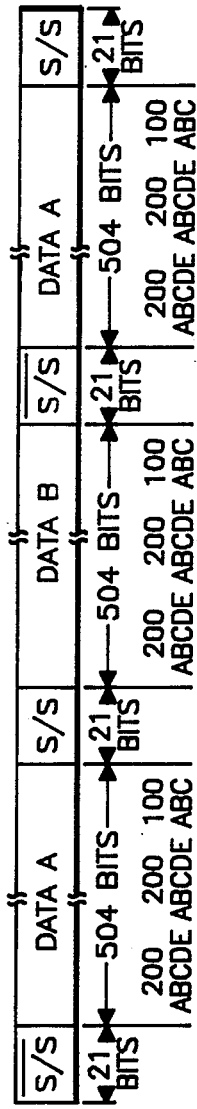
FIG. 12 is a timing diagram of the data format for 1200 bits per second data transfer employed in the data terminal mode of the present invention.

Transmission of data at a rate of 1200 BPS compatable with data terminals is shown in FIG. 12. Alternate S/S and $\overline{S/S}$ synchronization words indicate that the system is in the data terminal mode. SAT information is conveyed, as described previously, by the selection of which S/S and $\overline{S/S}$ words are transmitted. Inverse synchronization words, $\overline{S/S}$, may also be used to define double length frames, 1050 bits, which permit the utilization of forward control channel error correction. In the preferred embodiment, this error correction uses 5 word interleaving (A, B, C, D, E) for improved burst error protection at lower vehicle speeds.

FIG. 12 illustrates that two 504 bit frames may be defined by alternating S/S and $\overline{S/S}$ words. If frame synchronization is lost, this format allows quick double frame synchronization recovery. 500 bits from each frame are concatenated to form a 1,000 bit frame. This frame allows five repeats of 200 bit segments; each segment forming five different 40 bit words (A, B, C, D, E). At the receiver, the five 200 bit segment repeats are majority voted. The resulting five words of 40 bit each are then forward error corrected using (40, 28) BCH error correction. This technique results in 140 bits of corrected data every two frames (105 milliseconds). Thus, an effective data throughput of 1333.3 BPS, more than the required 1200 BPS rate, is provided. The added throughput can be used for modem control information, such as block parity and number of characters per block. Alternative error correction techniques can use the 1008 bit double frame data block to provide a higher effective data rate. A 2.4 KBS throughput requires 252 bits of data per double frame, which results in exactly a ¼th rate error correction.

Automatic digital data mode capability is provided by detecting an alternating sequence of S/S and $\overline{S/S}$ words. Due to the low cross correlation property between an S/S correlator words and its inverse (as chosen in the set of six correlator words), plus utilization of the entire 21 bit S/S word, a high degree of cross falsing protection is provided in system mode determination.

Figure 13:
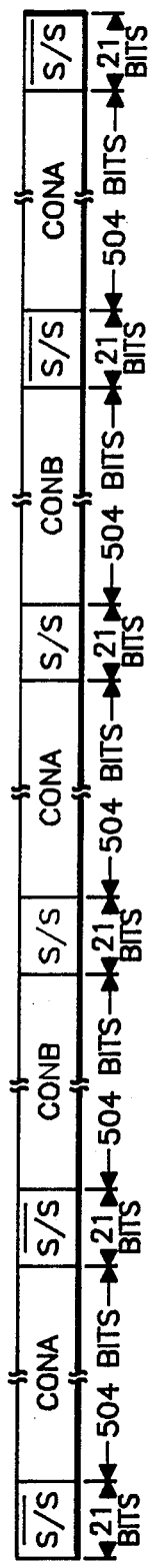
FIG. 13 is a timing diagram of the data halt format employed in the present invention.

After the conversation begins, all cellular radio-telephone system control messages (such as handoff or power change) are transmitted over the voice channels. While digitized speech can generally tolerate a message overriding the speech, data terminal transmission must be halted. FIG. 13 shows the preferred format which implements the data halt mode. As the figure indicates, an inverse SAT/SYNC word is included at every second word. This mode can be invoked by either the fixed site or the subscriber unit. While in the data halt mode, special control messages (CONA, CONB) can be transmitted between the fixed site and the subscriber unit. For example, parity and data rate messages can be sent from the subscriber unit to the fixed site modem before the data transmission mode is initiated or after a handoff to set up the new fixed site modem.

Figure 14:
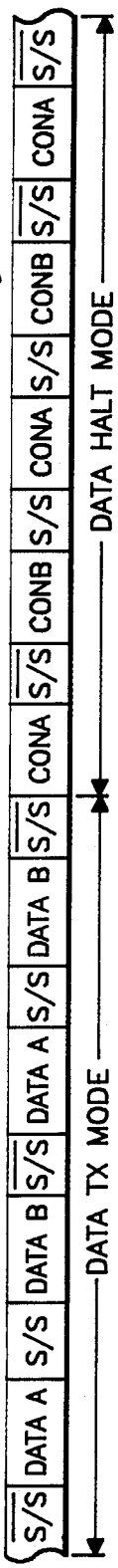
FIG. 14 is a timing diagram of the change between data terminal mode and data halt mode of the present invention.

Utilization of the data halt format as shown in Fig. 13 also provides a double frame synchronization for utilizing the same error control used during the transmission of 1200 baud data in the data terminal mode. CONA and CONB form a concatenated 1000 bit data frame, synchronized by the S/S words as shown in FIG. 13. When changing from data terminal transmit mode to data halt mode, the S/S word sequence as shown in FIG. 14 is used. This sequence changes modes without losing double frame synchronization continuity or SAT information. This data format may be used to send special messages (CONA, CONB as shown) or may temporarily continue to send data terminal information.

For example, to transmit a handoff command during the data terminal mode, the fixed site will switch to the data halt mode shown in FIG. 13 prior to sending the handoff control message. Data terminal information continues to be transmitted within the data halt mode format using the double frame synchronization. The subscriber unit detects the data halt mode, stops mobile to landline data transmission, and sends a message to the landline terminal to halt data transmission. Once the subscriber unit determines that landline to mobile data transmission has been halted, the subscriber unit transponds the new halt mode with its SAT information to the fixed site. The fixed site may then detect that data is halted in both direction and a handoff can proceed. After the handoff, the destination fixed site initially transmits SAT in the data halt system mode. The subscriber unit can send special messages to the fixed site in this mode to set-up a modem in the new cell. After the modem has been set-up, the fixed site may return to the transmit data terminal mode. Digital SAT transmission is never interrupted during these system mode changes.

Figure 15:
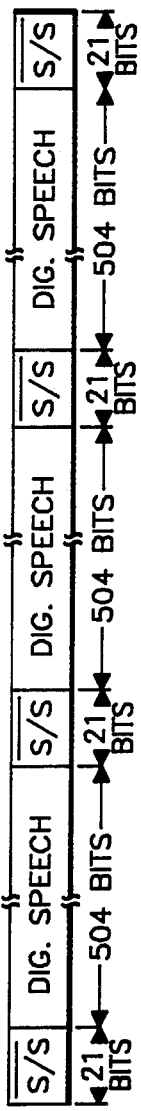
FIG. 15 is a timing diagram of the digitized speech (RF only) mode employed in the present invention.

A special digital speech mode can be used to provide speech privacy between the subscriber unit and the fixed site while providing clear speech to the cellular telephone exchange and the switch telephone network. The path most susceptible to interception, then, is protected without requiring the land end user to use a scrambling device. The signalling for this mode is shown in FIG. 15. Additionally, digital signalling tone information can be transmitted coherently with SAT during this mode using a format similar to that shown previously in FIG. 11 except that the SAT/SYNC words are inverse.

As previously described, the SAT/SYNC consists of 21 bit words transmitted at predetermined locations during data transmission. System state information is contained in the transmission of particular sequences of the three S/S words and their inverses. Detection of the particular sequence is achieved by correlation of a received S/S word to a predetermined word or its inverse. Thus, system information can be transmitted by varying the sequence of synchronization correlator words. These sequences of sync (S) and inverse sync ($\overline{S}$) words can also be thought of as sequences of ones (1) and zeros (0). In the present invention they are treated as such. Like conventional linear block coding theory, these synchronization word sequences can be sectioned into blocks with a minimum Hamming distance and can utilize conventional block codes. However, unlike conventional codes, the received sync sequence can have correct, incorrect, or missed sync words. Therefore, it is the task of the decoder of the present invention to correct and/or detect both sync word sequence errors and misses to properly decode the correct sequence.

Figure 16:
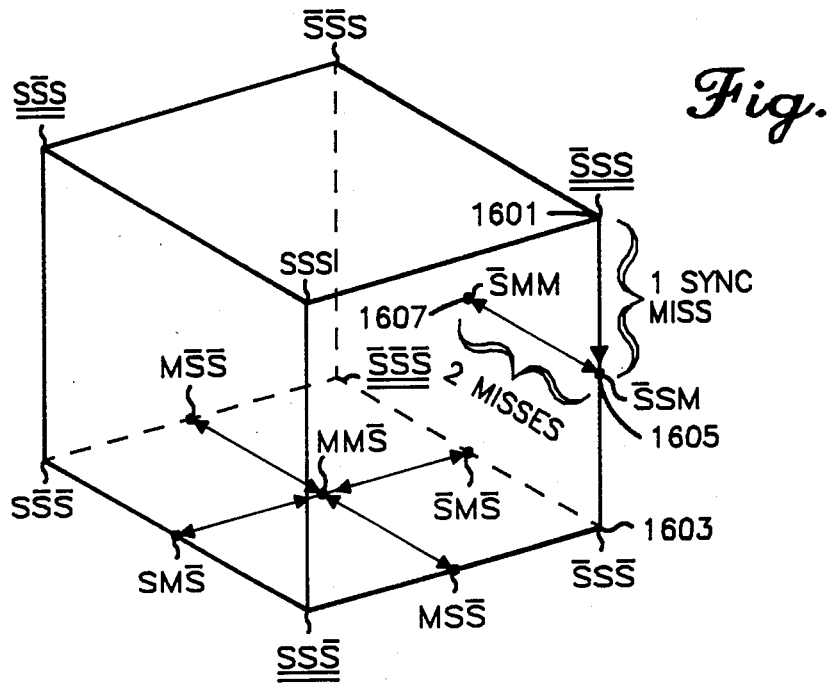
FIG. 16 is a three dimensional vector diagram in which the diagram corners represent possible synchronization code sequences and the circled corners illustrate a code of Hamming distance two.
Figure 17:
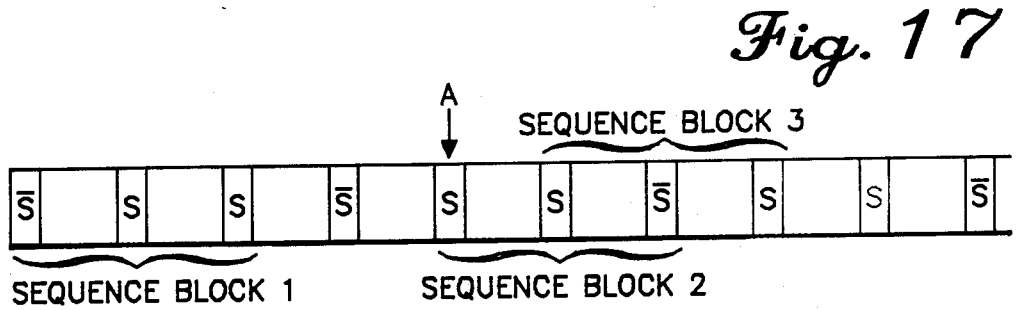
FIG. 17 is a timing diagram illustrating the three possible sequence blocks $\bar{S}$-S-S; S-$\bar{S}$-S; and S-S-$\bar{S}$ available when one synchronization word is transmitted as inverse.

The coding structure of sync sequences can best be understood by using a vector diagram as shown in FIG. 16. Vector graph representation is useful, because it can easily show the error and miss correction and detection capability of a sync sequence code. In order to keep the vector diagram only three dimensional, a simplified coding sequence is used. The vector points of the diagram represent the possible sync code sequences. These sequences are repeated continuously to represent a particular system state. For example, the sequence $\overline{S}$-S-S (point 1601 in FIG. 16) is transmitted as shown in FIG. 17. The figure shows that this sequence is made up of three cyclic "sequence blocks". Like conventional block codes, the coding of this sequence block is kept cyclic with a minimum distance between sequence blocks. Unlike conventional block coding, the continuous (repetitive) transmission of a sequence block, combined with its cyclic property, maps all of the cyclic shifts of this sequence block into the same transmitted sequence or system state. For example, if the sequence is picked up at point A in FIG. 17, the receive sequence block is S-S-$\overline{S}$. This is a cyclic shift of the sequence $\overline{S}$-S-S. Thus, the three cyclic sequence blocks that make up this particular system state are: $\overline{S}$-S-S, S-$\overline{S}$-S, and S-S-$\overline{S}$.

By combining all cyclic shifts of a sequence block into one system state, the recovery of this state can be initiated at any point of the received sequence. This greatly decreases the time to recover a decodable sequence block.

The sync sequence code represented by the indicated vector points in FIG. 16 are:

| System State 0: | $\overline{S}$-$\underline{S}$-S |
|---|---|
|  | S-$\overline{S}$-$\underline{S}$ |
|  | $\underline{S}$-S-$\overline{S}$ |
| System State 1: | S-S-S |

These sequence blocks which make up this sync sequence code have a minimum distance of 2. This can be seen on the vector graph in FIG. 16 as the distance between the indicated vector points of state 0 and state 1.

According to conventional coding, sync word errors map from one sequence block to another. For example if $\bar{S}$-S-S is transmitted and $\bar{S}$-S-$\bar{S}$ is received; this single sync error can be represented as moving from vector point 1601 to vector point 1603 in FIG. 16. (With a minimum distance of 2, this sync error can be detected but not corrected).

Missed sync words, however, require a new twist to vector graph representation: allowing the vector points to enter the planes and space between the sequence block points. This can be shown as follows on FIG. 16. Starting at sequence block point $\bar{S}$-S-S (at 1601), consider receiving a single sync word miss, $\bar{S}$-S-M. This is represented as point 1605 on the graph. Notice that this point is equidistant from sequence blocks $\bar{S}$-S-S and $\bar{S}$-S-$\bar{S}$. A second sync word miss to the second sync word ($\bar{S}$-M-M received) will map into the plane (point 1607). This vector point is equidistant from 4 sequence blocks starting with $\bar{S}$. This can be similarily shown for any of the sequence blocks on the graph. Receiving all misses maps into the center of the cube. This vector representation for sync word errors and misses extends to higher multidimensional vector graphs for more applicable sequence codes.

Sync word error correction and detection capabilities (with no sync word misses) follow convential code formulas. (See the following Theorems 1.1 and 1.2) For example, if the sync word sequence code has a minimum distance of 7, then 3 sync word errors can be corrected, or up to 6 sync word errors can be detected.

However, when sync word errors are combined with sync word misses, there is a trade-off in the error and sync correction capabilities. This is evident in the combined sync word error and sync word miss correction capability Theorems 1.3 and 1.4. For example, if the sync sequence has a minimum distance of seven, then a received sequence block with 4 misses and up to 1 sync word error can be corrected. Similarly, a received sync word sequence with either 1 or 2 missed sync words and up to 2 sync word errors can be corrected. Table 1 gives the sync error and sync miss correction trade-offs for this code:

TABLE 1

SYNC MISS AND ERROR CORRECTION CAPABILITIES
SYNC SEQUENCE CODE D-MIN = 7

| Miss | Error Correct |
|---|---|
| 0 | 3 |
| 1 | 2 |
| 2 | 2 |
| 3 | 1 |
| 4 | 1 |
| 5 | 0 |
| 6 | 0 |

Theorem 1.1
$E = [(D - 1)/2]$, where [ ] denotes a round-off to the largest integer no greater than $(D-1)/2$. (No sync misses)
Theorem 1.2
$Ed = (D-1)$
(No sync misses)
Combined sync errors and misses:
Theorem 1.3
$E = [(D - Mr - 1)/2]$
Theorem 1.4
$M = D - 2Er - 1$ TABLE 1-continued

SYNC MISS AND ERROR CORRECTION CAPABILITIES
SYNC SEQUENCE CODE D-MIN = 7 where:
D = minimum distance of sync sequence code
E = sync error correction capability
Ed = sync error detection capability
M = sync miss correction capability
Mr = number of received sync misses
Er = number of received sync errors These are guaranteed error and miss correction and detection capabilities. However, these are only theoretical capabilities. The actual decoding performance depends upon the decoder design. The above theorems will be used later in the decoder proofs.

Theorems 1.3 and 1.4 are an extension of conventional coding capability theorems, to include the case of combined sync word errors and sync word misses.

Figure 18:
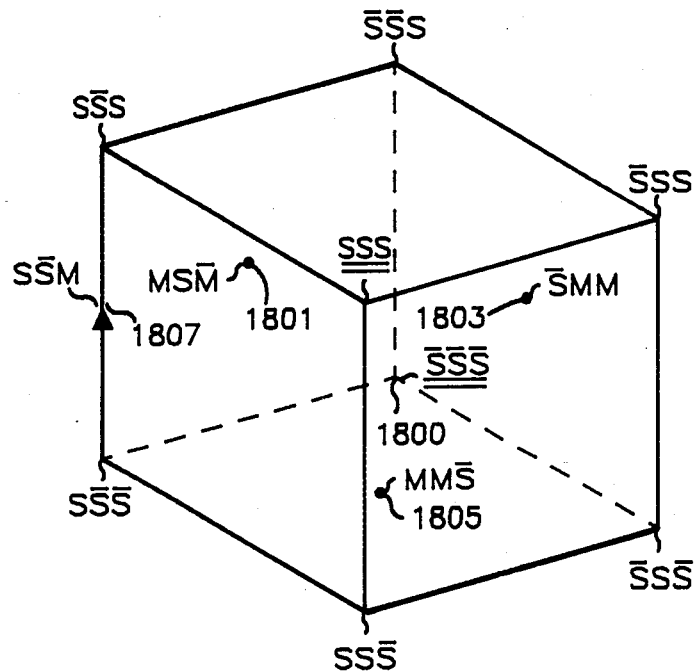
FIG. 18 is a three dimensional vector diagram illustrating that two synchronization word misses can be corrected when the code is of Hamming distance three.

Theorems 1.3 and 1.4 can be graphically demonstrated for a very simplified sync word sequence code with sequence blocks of $\bar{S}$-$\bar{S}$-$\bar{S}$ and S-S-S, shown in FIG. 18. Theorem 1.4 says that this sequence code (minimum distance=3) can correct two misses and zero sync word errors or one sync error and no misses. Starting at vector point $\bar{S}$-$\bar{S}$-$\bar{S}$, 1800, any two misses will map into one of the three plane points shown as points 1801, 1803, and 1805. All three points are correctable to $\bar{S}$-$\bar{S}$-$\bar{S}$. However, a received sequence block with 1 miss and 1 error could result in vector point 1807 (S-$\bar{S}$-M) which is not correctable, as forecast by Theorem 1.3 and Theorem 1.4. Misses cannot map one sequence block into another, as was shown in FIG. 16.

At least three synchronization sequence decoder types may be employed in the present invention and are described hereinafter. Two of the sequence decoders use received sync word sequence and miss detect information to "address" the closest valid sequence via either a ROM table or a conventional combinational circuit. These two decoder methods generally are useable only when the number of valid sync word sequences is small. A third sequence decoder decodes the received sequence without requiring an exhaustive test of each sequence. Since the number of misses that can be corrected can be greater than the $[(D-1)/2]$ number of correctable errors, it is possible to decode a received sequence into the wrong system state. A technique is therefore necessary for determining whether the decoded sequence is correct and will be shown in the third sequence decoder type.

In the first synchronization sequence decoder, the received sync sequence is detected by a single correlator with two thresholds. For example, if a 21 bit synchronization word has a threshold of two or fewer allowed bit errors, then the inverse synchronization word is detected if there are 19 or more errors.

The received detect/miss history is saved in a register (detect register) with the following coding: Sync detect =1, Sync miss=0. The received detect sync/sync sequence history is saved in a second register (sequence register) with the coding: Sync detect =1, Inverted Sync detect =0, Sync miss =0. Table 2 shows a sync sequence code with a minimum distance (D) equal to two and equivalent system states.

TABLE 2

| Sequence Block | System State |
|---|---|
| 0000 | 1 |

TABLE 2-continued

| Sequence Block | System State |
|---|---|
| 0101 | 2 |
| 1010 | |
| 1001 | 3 |
| 1100 | |
| 0110 | |
| 0011 | |
| 1111 | 4 |

According to Theorems 1.3 and 1.4, this code can correct 1 miss and zero sync errors within a sequence block of 4 sync words. One sync error with no misses or two or more misses can be detected but not corrected.

Figure 19:
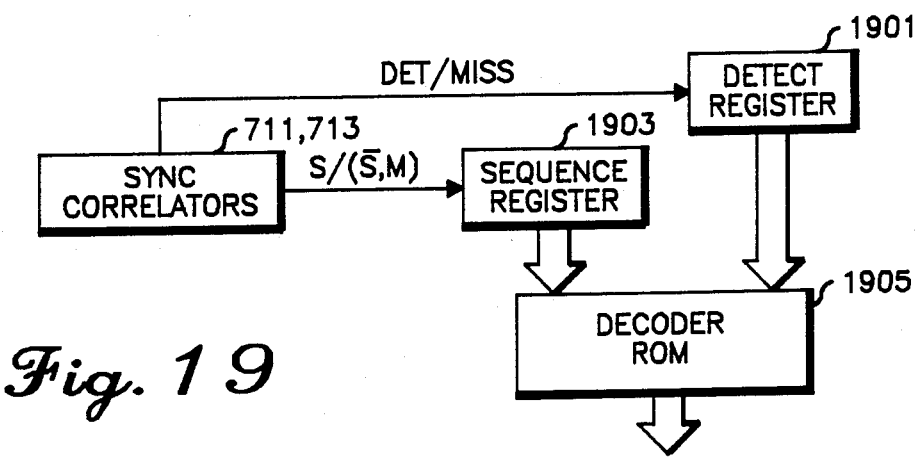
FIG. 19 is a block diagram of a synchronization sequence decoder which may be employed in the present invention and which utilizes a ROM table to determine the closest synchronization word sequence.

Four bit sequence and detect history registers require a 256 state ROM for decoding. One possible configuration is shown in FIG. 19. Here the sync correlators, 711, 713, provide outputs to detect register 1901 and sequence register 1903: sync word detection or miss is coupled as a binary logic level to detect register 1901 and sync word detection or inverse sync word detection or miss is coupled to sequence register 1903. Registers 1901 and 1903 may be implemented as a dual 4 bit shift register (MC74HC14015 or equivalent). The decoder ROM 1905 may be a conventional read only memory (such as an MCM65516C43 or equivalent) which provides an 8 bit output corresponding to the decoded system state or detection of an uncorrectable sequence block. The following table 3 shows part of the decoder ROM 1905 fill:

TABLE 3

| ROM ADDRESS (Seq./Detect) | ROM OUTPUT* (System State) |
|---|---|
| 0000/1111 | 01 ... |
| 1111/1111 | 04 ... |
| 1101/1101 | 04 1 Sync miss |
| 0001/0111 | 03 1 Sync miss |
| 0000/1110 | 01 1 Sync miss |
| 0100/1100 | FF 2 Sync misses |
| 1101/1111 | FF Sync error |

*Detection of uncorrectable sync error or miss = FF

For long synchronization words, the probability of a sync miss is much greater than a sync error. For this reason, a system designer might decide to correct for sync word misses only and detect sync word errors. This is also the case, of course, for sync word sequence codes with a minimum distance of 2.

Figure 20:
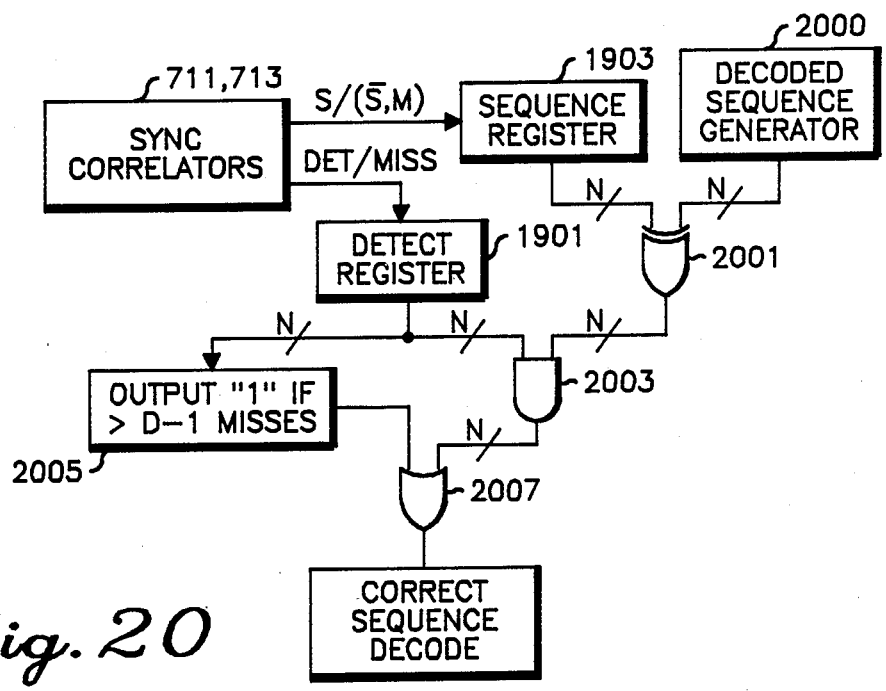
FIG. 20 is a block diagram of a synchronization sequence decoder which may be employed in the present invention and which is capable of correction of all synchronization misses up to the capability of the code and detection of synchronization errors.

The circuit in FIG. 20, illustrating a second synchronization sequence detector technique, will correct all misses up to the capability of the code as defined by Theorem 1.4 with E=0. It will also detect sync errors up to the capability of Theorem 2.1.

Theorem 2.1

$$E_d = D - M_r - 1$$

where:
D=minimum distance of sync sequence code
Ed=sync error detection capability
Mr=received sync misses.

In FIG. 20, the output of sequence register 1903, which is equivalent to a "selected" sync word sequence (Rsel) with values for the missed sync words selected as "0" in the preferred embodiment, is exclusive-ORed with the output of a decoded sequence generator 2000, which may be an up-counter (such as an MC74HC161 or equivalent), by an exclusive-OR (EX-OR) function 2001. function 2001. The decoded sequence generator 2000 output is a parallel equivalent of a decoded sync word sequence (Sdec). The resulting output from the EX-OR 2001 is a parallel word in which the number of 1's is equal to the Hamming distance between Rsel and Sdec. The EX-OR 2001 output is, in turn, ANDed with the output of detect register 1901 (which output indicates the relative position of the selected sync word detection values) in conventional AND function 2003. In the preferred embodiment, each selected sync word position is indicated by a zero. The resultant output of AND 2003 is the Hamming distance between Rsel and Sdec, with the selected sync word detection values deleted (or "masked") from the Hamming distance, and if all zeroes are found between Rsel and Sdec when masked, a correct decode has occurred. If an incorrect decode has occurred (as shown by a non all zero output from AND 2003), the sequence block generator 2000 is incremented to the next possible sequence and the process is repeated. In this type of decoder no errors in the detected sync words can be corrected.

Figure 22:
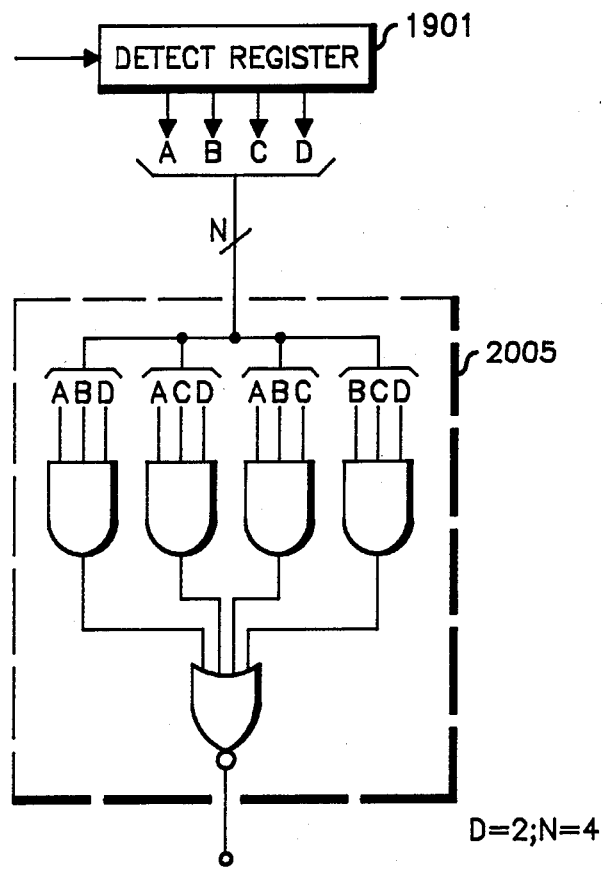
FIG. 22 is a block diagram of a miss counter for logic distance 2.

The output of detect register 1901 is also further processed in a miss counter 2005, which is a combinational logic circuit which outputs a logic "1" if more than D−1 zeros are held in the detect register 1901. Such a logic circuit for D=2 is shown in FIG. 22. If more than D−1 misses are counted, the output from miss counter 2005 is a binary "1". If the number of misses are equal to or less than D−1, the output from miss counter 2005 is a binary "0". The miss counter 2005 output is conventionally OR-ed with the output of AND function 2003 in OR function 2007 to enable the phase state of the correct code to be provided. The function of the circuit of FIG. 20, in summary, is to iterate through all the possible sync word sequences, comparing each iterated sequence to the received sync word sequence until a correct system state decode can be achieved within the error correction capability of the code.

As an example, assume the sync word sequence code of Table 2 is used. The transmitted sequence is S-S-$\bar{S}$-$\bar{S}$, and the received sequence is S-M-$\bar{S}$-$\bar{S}$. (Same system state with one sync miss) The sequence register 1903 will hold 1000 and the detect register 1901 will hold 1011. With a first iteration of a sequence of 1010 generated by the sequence block generator 2000, the EX-OR circuit 2001 output is 0010 and the AND circuit 2013 output is 0010. This is not the all zero state necessary for a correct decoding of the received sync word sequence; the sequence is then iterated. With a sequence of 1100 generated the EX-OR 2001 output is 0100 and the AND circuit 2003 output is 0000-a correct decode of system state 3.

The third synchronization sequence decoder of the preferred embodiment will correct all combinations of errors and misses within the bounds defined by Theorems 1.3 and 1.4 for all sync word sequence codes having a cyclic minimum distance D. The criteria for determining if the decoded system state is correct or incorrect is presented in the following three proofs. The Hamming distance between two sequences, S1 and S2 will be denoted as d(S1, S2). (Distance is defined as the number of elements which differ between two linear codes). The Hamming distance is computed with the coding: S=1, $\bar{S}$=0, and with sync misses selected as either 1 or 0.

Theorem 3.1

Let Rsel be a received sync word sequence with all misses selected to maximize the Hamming distance between the transmitted (St) and selected (Rsel) received sync sequences, and also minimize the Hamming distance between Rsel and an incorrect sync sequence (system state). Given Mr received sync word misses, Theorem 1.3, $E=[(D-Mr-1)/2]$, defines the number of sync errors, E, which can be corrected for this code.

If the decoded sequence (Sdec) is an incorrect sequence, then $\overline{d(Rsel, Sdec)} > E$.

St=Transmitted sync word sequence
Sr=Received sync word sequence
Rsel=Selected sync word sequence (with misses in Sr selected)
Sdec=Decoded sync word sequence.

Proof:
Utilizing the triangle inequality (see S. Lin et al. "Error Control Coding", Prentis-Hall, 1983, page 63): $d(v,w)+d(w,x)>d(v,x)$ $$d(St, Rsel) + d(Rsel, Sdec) \geq d(St, Sdec) \qquad 1.$$

Rearranging:

$$d(Rsel, Sdec) \geq d(St, Sdec) - d(St, Rsel) \qquad 2.$$

For a worst case selection of missed sync detects, $$d(St, Rsel) = Mr + Er = M + E \qquad 3.$$

All misses are incorrectly selected.
Both Mr and Er have the maximum possible values consistent with a correct decode as defined by Theorems 1.3 and 1.4., i.e. Mr=M, Er=E. This also minimizes d(Rsel, Sdec), for Sdec being an incorrect sync sequence decode.
For an incorrect system state decode, $$d(St, Sdec) = D \qquad 4.$$

Substituting equation 3 and equation 4 into equation 2 gives:

$$d(Rsel,Sdec) \geq D - (M+E) \qquad 5.$$

Substituting Theorem 1.4 ($M=D-2E-1$) into equation 5 gives:

$$d(Rsel,Sdec) \geq D - (D-2E-1+E) \qquad 6.$$

The received sequence is bounded by the sync word error and miss criteria of Theorem 1.4.
Rearranging:

$$(Rsel,Sdec) > E+1 \qquad 7.$$

$$d(Rsel,Sdec) > E \qquad 8.$$

This is the lower bound, even with the selection in equation 3, which minimized d(Rsel,Sdec).

The above proof gives a lower bound for the Hamming distance between the received selected sequence, Rsel, and an incorrect decoded sequence Sdec. If a non overlapping upper bound for a correct decode can be determined, then the criteria for a sync sequence decoder is established.

Theorem 3.2 If the missed sync words of the received sync sequence and the corresponding sync words of a correctly decoded sequence are masked, then the distance between the two sequences is less than or equal to E. Where E is derived from Theorem 1.3.

$d(Rsel,Sdec)$ masked$\leq E$ where $E=[D-Mr-1)/2]$ and Sdec is correctly decoded.

Proof:
For a correct decode of the received sync word sequence with selected missed sync words, the distance $$d(Rsel,Sdec) \leq [(D-1)/2] \qquad 1.$$

Rearranging Theorem 1.4 ($D=M+2Er+1$). Let Er have the maximum possible value consistent with a correct decode as defined by Theorem 1.3 ie. Er=E, and $D=M+2E+1$. $\qquad 2.$ Substituting equation 2 into equation 1 gives:

$$d(Rsel,Sdec) \leq [(M+2E)/2] \qquad 3.$$

For a masked difference:

$$d(Rsel,Sdec)m \leq [2E/2] = E \qquad 4.$$

$d(v,w)m$ denotes that the distance is determined after the missed sync words are masked, and have no bearing on the distance calculated.

$$d(Rsel,Sdec)m \leq E \qquad 5.$$

Therefore, by masking the received sequence and the decoded sequence prior to determining the distance, a criteria for a correct sync sequence decode exists which does not overlap the criteria for determining an incorrect sync sequence decode. Masking, as the term is used herein, is the process of determining the value of the Hamming distance between the selected sync word sequence (Rsel) and the decoded sync word sequence (Sdec) with the substituted values of the missed words removed from the calculation. For example, if the transmitted sync word sequence St=0000000, and the received sync word sequence Sr=MM11000, a selected sync word sequence Rsel could be selected as 1111000. This Rsel would be decoded as the decoded sync word sequence Sdec of 1111111—a totally erroneous system state. Masking the selected values for the missed sync words yields an $(Rsel)_m = 11000$. Comparing $(Rsel)_m$ to a masked $(Sdec)_m$ of 11111 yields a Hamming distance of $3=d(Rsel, Sdec)_m$. Calculating the value of E from theorem 1.3 and the fact that minimum distance between system states (D) in this example equals 7 and the number of received sync misses (Mr) equals 2, yields E=2. Thus, $d(Rsel, Ddec)_m = 3 > E = 2$ which violates the inequality of equation 5 of theorem 3.2 and proves that the decoded sync word sequence is incorrect. A new set of values for the missed sync words must be substituted and the Hamming distance recalculated for a new decoded sync word sequence. When the inequality of equation 5 is satisfied, a correct decode has been achieved.

Masking the misses before determining d(Rsel,Sdec) for the case in which an incorrect decode is made does not change the results of Theorem 3.1. This is because the misses that are masked from equation 3 of Theorem 3.1 are also masked from the overall distance D in equation 4. See Theorem 3.3 and the following proof.

Theorem 3.3
IF the decoded sequence (Sdec) is an incorrect sequence, then $d(Rsel,Sdec)m > E$.

where $E = [(D - Mr - 1)/2]$

Proof:

Utilizing the triangle inequality:

$$d(v,w) + d(w,x) > d(v,x) \qquad d(St,Rsel)m + d(St,Sdec)m > d(St,Sdec)m \qquad 1.$$

Rearranging:

$$d(Rsel,Sdec)m > d(St,Sdec)m - d(St,Rsel)m \qquad 2.$$

For a worst case selection of missed sync word detects, $$d(St,Rsel) = Mr + Er = M + E \qquad 3.$$

All misses are incorrectly selected. Both Mr and Er have the maximum possible values consistent with a correct decode as defined by Theorems 1.3 and 1.4. ie. $Mr = M$, $Er = E$. *This also minimizes $d(Rsel,Sdec)$.*
Rearranging Theorem 1.4; $(D = M + 2E + 1)$ The distance with misses masked becomes:

$$D = 2E + 1 \qquad 4.$$

For an incorrect system state decode, $$d(St,Sdec)m = D(masked) = 2E + 1. \qquad 5.$$

Substituting equation 3 and eq. 5 into eq. 2 gives:

$$d(Rsel,Sdec)m \geq 2E + 1 - E. \qquad 6.$$

The received sequence is bounded by the sync word error and miss criteria of Theorem 1.4.

Rearranging:

$$D(Rsel,Sdec)m \geq E + 1 \qquad 7.$$

$$d(Rsel,Sdec)m > E \qquad 8.$$

Figure 21:
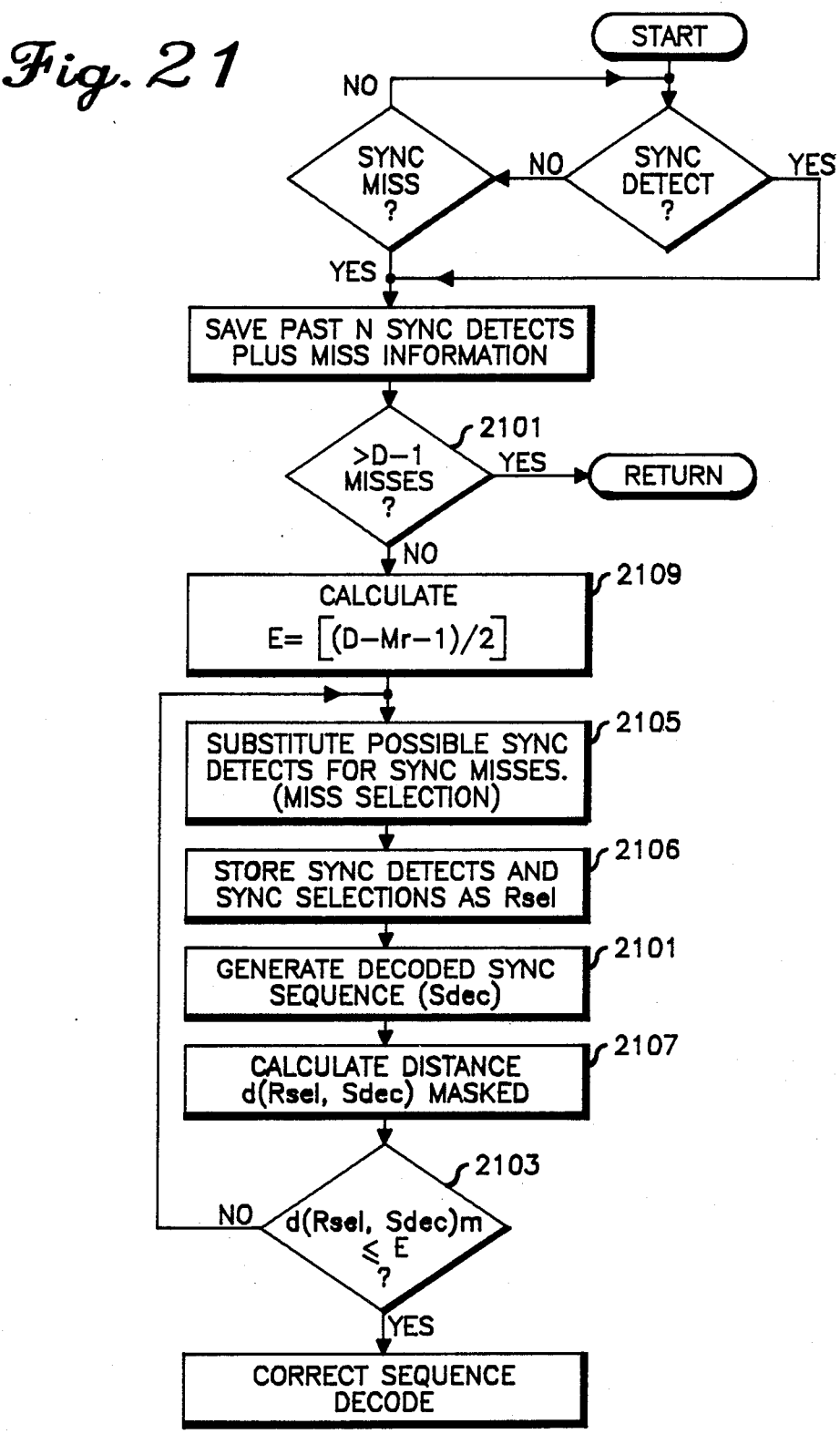
FIG. 21 is a flow chart for a synchronization sequence decoder which may be employed in the present invention and which is capable of correcting combinations of synchronization errors and synchronization misses.

Based upon the results of Theorems 3.2 and 3.3, a novel sync word sequence decoder process such as that shown in FIG. 21 can be implemented to correct for combinations of both sync word errors and misses. This decoder operates in conjunction with digital cellular signalling control (DCSC) functions 503 and 523 (shown in FIG. 5) and, more specifically may be implemented in the preferred embodiment as a subroutine to the instruction set of microprocessor 701 (FIG. 7). The sync word sequence decoder of FIG. 21 iterates through possible miss sequence possibilities, until the correct decode is confirmed but, significantly, does not need to iterate through all possible sequences thereby realizing a substantial savings of iteration time. The "Decode N sync sequence block" 2101 utilizes any conventional cyclic decoder. The received sync sequence loaded into this decoder is represented as a series of 1's and 0's, with the missed sync word value selected as a 1 or 0. In one embodiment the value is arbitrarily or randomly selected. In a second, the value is based upon an examination of the word and a best guess approximation is used to select the substitution values. Either technique may be employed in the present invention.

The possibility of the decoder mapping into the wrong sequence comes about because the number of correctable sync misses in Theorem 1.4 is greater than the sync error correction capability (Theorem 1.1) of the sequence code. For example, if $D = 7$, and there are no sync errors, up to 6 sync word misses can be corrected. (If greater than 6 misses, in this example, are detected, the decoder process is aborted at 2102). This is much larger than the Theorem 1.1 result of 3. When the decoder incorrectly decodes the receive sequence, the test of $d(Rsel,Sdec)m > E$ at 2103, indicates that the decoded sequence is not correct and returns for a new set of detect values substituted for the missed syncs at 2105 and the missed sync values are saved with the sync detects at 2106.

For example, again assume a receive sync sequence with a minimum distance of $D = 7$ between system states. For this sequence code, the correctable combinations of sync misses and sync errors is shown in Table 1 (Derived from the value of E of Theorem 1.3.) Assume a received sequence block arrives with 2 sync misses and either 0, 1 or 2 unknown sync errors. If the sync misses are incorrectly selected to cause an incorrect decode into the wrong sequence state, then the resulting masked Hamming distance between the received sequence and the decoded sequence, $d(Rsel,Sdec)m$ determined at 2107, will be greater than $E = 2$ as determined from the E value calculation of 2109. If this distance is equal to or less than 2, then the decoded sequence is the correct sequence. That is, all sync word errors and all incorrectly selected sync word misses have been corrected.

Thus, a cyclic decoder of synchronization bit patterns for a radiotelephone system carrying digital messages has been shown and described. Substantial reliability over a fading or noisy communications channel is realized from the use of 21 bit high autocorrelation, low self-correlation synchronization words and from the use of a novel error detection and correction technique which employs the fact that a synchronization word may be missed without being decoded as a wrong word. A substitution of a selected synchronization word detected value for a missed word detected value in a sequence of synchronization words detections enables a decoding function to test the sequence for Hamming distance between the sequence and possible correct sequences. If the Hamming distance is less than or equal to the synchronization error correction capability of the coding function, a correct sequence is accepted. If the Hamming distance is greater than the synchronization error correction capability value, another selection of substitute synchronization word detect values for missed words is attempted until a decoded sequence with an acceptable Hamming distance is realized.

Therefore, while a particular embodiment of the invention has been described and shown, it should be understood that the invention is not limited thereto since modifications may be made by those skilled in the art. It is therefore contemplated to cover by the present application any and all such modificaitions that fall within the true spirit and scope of the basic underlying principles disclosed and claimed herein.

I claim:

1. A decoder for decoding system states conveyed in sequences of multi-bit normal words and inverse words used for synchronizing digital messages transmitted over a radio channel which may introduce bit errors into said words, said decoder comprising:

means, responsive to the introduced bit errors, for detecting a normal word, an inverse word, and a word miss and for assigning a first binary level to said detected normal word, a second binary level to said detected inverse word, and a selected one of said binary levels to said word miss, thereby creating a selected sequence of binary levels;

means for generating a decoded sequence of binary levels corresponding to one of the system states; and means for comparing said selected sequence and said decoded sequence and for indicating a correct system state decode when said selected and decoded sequences have a predetermined correlation therebetween.

2. A decoder in accordance with claim 1 wherein said means for comparing further comprises means for masking said selected binary levels in said selected sequence and corresponding binary levels in said decoded sequence, thereby creating a masked selected sequence and a masked decoded sequence.

3. A decoder in accordance with claim 2 wherein said means for comparing further comprises means for calculating the Hamming distance between said masked selected sequence and said masked decoded sequence.

4. A decoder in accordance with claim 3 wherein said means for comparing further comprises means for comparing said calculated Hamming distance to a synchronization error correction capability value.

5. A decoder in accordance with claim 4 further comprising means, responsive to said Hamming distance comparison to said synchronization error correction capability value, for changing said selected binary levels if said Hamming distance is greater than said synchronization error correction capability value.

6. A decoder in accordance with claim 1 wherein said means for selecting one of said binary levels further comprises means for randomly selecting a binary level.

7. A decoder in accordance with claim 1 wherein said means for selecting one of said binary levels further comprises means for selecting a binary level based on best-guess information.

8. A decoder in accordance with claim 1 further comprising means for counting the number of selections of a binary level made during the sequence of normal and inverse words.

9. A decoder in accordance with claim 8 further comprising means for indicating an incorrect system state decode when said count of the number of selections equals or exceeds the minimum distance of synchronization sequence code.

10. A system for decoding control information contained in a sequence of normal and ones complement inverse synchronization words of a data message which may be transmitted on a noisy communications channel, said system for decoding comprising:
means for receiving said synchronization words;
means for detecting a normal word, an inverse word, and a word miss and for assigning a first binary level to said detected normal word if fewer than a first predetermined number of bit errors exist, assigning a second binary level to said detected inverse word if fewer than said first predetermined number of bit errors exists, and assigning a selected one of said binary levels to said word miss detection if said first predetermined number of bit errors is equalled or exceeded thereby creating a selected sequence;
means for decoding said selected sequence into a decoded sequence;
means for masking said selected binary levels in said selected sequence and masking corresponding binary levels in said decoded sequence, thereby creating a masked selected sequence and a masked decoded sequence;
means for calculating the Hamming distance between said masked decoded sequence and said masked selected sequence;
means for determining whether said Hamming distance is less than a second predetermined number, thereby indicating correctly decoded control information; and
means for changing one or more of said selected binary levels if said Hamming distance is greater than said second predetermined number.

11. A system in accordance with claim 10 further comprising means for counting the number of selections of a binary level made during the sequence of normal and inverse synchronization words.

12. A system in accordance with claim 11 further comprising means for indicating incorrectly decoded control information when said count of the number of selections equals or exceeds the minimum distance of the synchronization sequence code.

13. A system in accordance with claim 10 wherein said means for determining whether said Hamming distance is less than a second predetermined number further comprises means for determining whether said Hamming distance is equal to said second predetermined number, thereby indicating correctly decoded control information.

14. A system in accordance with claim 10 wherein said means for changing one or more of said selected binary levels if said Hamming distance is greater than said second predetermined number further comprises means for changing one or more of said selected binary levels if said Hamming distance is equal to said second predetermined number.

15. A system in accordance with claim 10 wherein said means for selecting one of said binary levels further comprises means for randomly selecting a binary level.

16. A system in accordance with claim 10 wherein said means for selecting one of said binary levels further comprises means for selecting a binary level based on best-guess information.

17. A system in accordance with claim 10 wherein said second predetermined number further comprises the synchronization error correction capacity value.

18. A method of decoding system states conveyed in sequences of normal and inverse synchronization words in a radiotelephone system carrying digital messages, said method of decoding comprising the steps of:
detecting a normal word as one binary level and detecting an inverse word as the opposite binary level if fewer than a predetermined number of bit errors exist in the word to be detected;
selecting one of the binary levels for a word detection if said predetermined number of errors is exceeded;
combining said detected word binary levels and any said selected binary levels into a selected sequence of binary levels;
generating a decoded sequence of binary levels corresponding to one of the system states; and
comparing said selected sequence and said decoded sequence and indicating a correct sequence decode when said selected and decoded sequences have a predetermined correlation therebetween.

19. A method in accordance with the method of claim 18 wherein said comparing step further comprises the step of masking said selected binary levels in said selected sequence and corresponding binary levels in said decoded sequence, thereby creating a masked selected sequence and a masked decoded sequence.

20. A method in accordance with the method of claim 18 wherein said comparing step further comprises the step of calculating the Hamming distance between said masked selected sequence and said masked decoded sequence.

21. A method in accordance with the method of claim 20 wherein said comparing the step further comprises the step of comparing said calculated Hamming distance to a synchronization error correction capability value.

22. A method in accordance with the method of claim 21 further comprising the step, responsive to said calculated Hamming distance comparing step, of changing said selected binary levels if said Hamming distance is greater than said synchronization error correction capability value.

23. A method in accordance with the method of claim 21 further comprising the step, responsive to said calculated Hamming distance comparing step, of changing said selected binary levels if said Hamming distance is equal to said synchronization error correction capability value.

24. A method in accordance with the method of claim 18 wherein said step of selecting one of the binary levels further comprises the step of randomly selecting a binary level.

25. A method in accordance with the method of claim 18 wherein said step of selecting one of the binary levels further comprises the step of selecting a binary level based on best-guess information.

26. A method in accordance with the method of claim 18 further comprising the step of counting the number of selections of a binary level made during the sequence of normal and inverse synchronization words.

27. A method in accordance with the method of claim 26 further comprising the step of indicating an incorrect sequence decode when said count of the number of selections equals or exceeds the minimum distance of the synchronization sequence code.

28. A method of decoding control information contained in a sequence of normal and ones complement inverse synchronization words of a data message which may be transmitted on a noisy communications channel, said method of decoding comprising the steps of:
receiving said synchronization words;
detecting a normal word, an inverse word, and a word miss and assigning a first binary level if fewer than a first predetermined number of bit errors exist, assigning a second binary level to said detected inverse word if fewer than said first predetermined number of bit errors exist, and assigning a selected one of said binary levels to said word miss detection if said first predetermined number of bit errors is equalled or exceeded thereby creating a selected sequence;
decoding said selected sequence into a decoded sequence;
masking said selected binary levels in said selected sequence and masking corresponding binary levels in said decoded sequence, thereby creating a masked selected sequence and a masked decoded sequence;
calculating the Hamming distance between said masked decoded sequence and said masked selected sequence;
determining whether said Hamming distance is less than a second predetermined number, thereby indicating correctly decoded control information; and
changing one or more of said selected binary levels if said Hamming distance is greater than said second predetermined number.

29. A method in accordance with the method of claim 28 further comprising the step of counting the number of selections of a binary level made during the sequence of normal and inverse synchronization words.

30. A method in accordance with the method of claim 29 further comprising the step of indicating incorrectly decoded control information when said count of the number of selections equals or exceeds the minimum distance of the synchronization sequence code.

31. A method in accordance with the method of claim 28 wherein said step of determining whether said Hamming distance is less than a second predetermined number further comprises the step of determining whether said Hamming distance is equal to said second predetermined number, thereby indicating correctly decoded control information.

32. A method in accordance with the method of claim 28 wherein said step of changing one or more of said selected binary levels if said Hamming distance is greater than said second predetermined number further comprises the step of changing one or more of said selected binary levels if said Hamming distance is equal to said second predetermined number.

33. A method in accordance with the method of claim 28 wherein said step of selecting one of said binary levels further comprises the step of randomly selecting a binary level.

34. A method in accordance with the method of claim 28 wherein said step of selecting one of said binary levels further comprises the step of selecting a binary level based on best-guess information.

* * * * *